United States Patent [19]

Mills et al.

[11] 4,196,028

[45] Apr. 1, 1980

[54] TAPING TOOL

[76] Inventors: Harold R. Mills, 2636 Flintridge Pl.; Robert F. Mills, 1305 Newsom, both of Ft. Collins, Colo. 80521

[21] Appl. No.: 827,985

[22] Filed: Aug. 26, 1977

[51] Int. Cl.[2] ........................ B32B 31/00; B44C 7/04; B44C 7/06; E04F 13/00

[52] U.S. Cl. ...................................... 156/71; 156/523; 156/524; 156/526; 156/574; 156/575; 156/577; 156/579

[58] Field of Search ................. 156/71, 523, 524, 526, 156/574, 575, 577, 579, 295

[56] References Cited

U.S. PATENT DOCUMENTS

| | | | |
|---|---|---|---|
| 2,235,704 | 3/1941 | Gorbatenko et al. | 156/526 X |
| 2,725,740 | 12/1955 | Borgstrom | 15/235.4 |
| 2,846,106 | 8/1958 | Castiglione . | |
| 3,006,495 | 10/1961 | Miller | 156/526 |
| 3,116,195 | 12/1963 | Lathrop et al. | 156/575 |
| 3,260,638 | 7/1966 | Hoveland | 156/575 |
| 3,707,427 | 12/1972 | Erickson | 156/575 |
| 3,880,701 | 4/1975 | Moree | 156/526 |
| 3,925,145 | 12/1975 | Ames | 156/579 |
| 3,932,101 | 1/1976 | Johnson et al. | 425/458 |
| 3,968,001 | 7/1976 | Lockwood | 156/523 |
| 4,003,781 | 1/1977 | Holsten | 156/526 |

*Primary Examiner*—William A. Powell
*Assistant Examiner*—Robert A. Dawson
*Attorney, Agent, or Firm*—Burton & Dorr

[57] ABSTRACT

The present invention involves a portable taping tool for applying tape over joints in wallboard, sheet rock, gypsum board, drywall, and the like. The taping tool has a main frame which has a dispensing chamber for joint compound, a mounting for a roll of tape, main rollers, a second roller, and a tape cutting blade. In one embodiment, the second roller is a corner roller that not only creases the tape but also squares it in the corner. In another embodiment, the second roller is a substantially cylindrical roller which has a slightly concave shape to its working surface. The cylindrical, second roller is used to apply tape over flat joints and its slightly concave shape serves to concentrate the joint compound towards the middle of the tape so that joint compound will be more evenly distributed when the tape is wiped down. The second roller of each of these embodiments can be rigidly supported in a forward, extended position or spring biased in a forward, extended position. The tape cutting blade in each of the embodiments is supported to move along a path between the main rollers and second roller. With the taping tool of the present invention, the tape can be more easily seen and more accurately cut to fit the wallboard section, corner joint, or ceiling joint. Further, once the tape is cut, the end of the freshly cut tape still extends outwardly of the tool beyond the main rollers so that the taping tool can be manipulated to apply the tape to a new section without having to manually restring the tape about the main rollers. Rollers are also provided at the tape inlet and tape outlet of the dispensing chamber so that the tape can more easily and smoothly pass through the dispensing chamber.

12 Claims, 12 Drawing Figures

TAPING TOOL

FIELD OF THE INVENTION

The present invention relates to the field of taping tools for wallboard, sheet rock, gypsum board, drywall, and the like.

BACKGROUND OF THE INVENTION AND PRIOR ART

A widely used construction technique involves securing wallboard to the frame members of a building and then sealing, taping, and plastering over the joints between adjacent wallboards so as to create the appearance of a solid wall. Joints at corners and between the walls and ceilings are also taped to enhance the appearance. The tape is usually applied by using a portable taping tool which contains a quantity of joint compound and through which a continuous strip of tape is run. As the tape passes through the taping tool, the joint compound is applied to one side of it and that side is placed over the joint.

A popular taping tool is called the banjo and consists of a main frame with a dispensing chamber, a support for a roll of tape, and a tape cutting blade. Joint compound is placed in the dispensing chamber and the tape is run through the dispensing chamber where the joint compound is applied to one side of it. The tape cutting blade is mounted to the main frame adjacent the outlet of the dispensing chamber. The taping tool can be manipulated so that the blade presses the tape over the joint between adjacent wallboards and the taping tool can be further manipulated so that the blade cuts the tape at a desired location.

U.S. Pat. No. 3,707,427 to Erickson issued on Dec. 26, 1972 is a modification of the basic design of the banjo in which the joint compound is continuously being fed to the dispensing chamber through a hose 60 from a remote supply of joint compound. With Erickson's taping tool, the operator saves some time in that he does not have to stop and refill the dispensing chamber several times while using a single roll of tape as is the case with most other taping tools. Another taping tool which continuously feeds the joint compound to the dispensing chamber is U.S. Pat. No. 3,116,195 to Lathrop, et al. issued on Dec. 31, 1963. Lathrop's valve 60 controls the feed out of the joint compound through line 44 to the dispensing chamber 72. Lathrop has a creasing roller 166 which is selectively retracted and extended and is normally biased by spring 174 into its retracted position as shown in his FIG. 4. Lathrop has a cutter 78 which can be moved perpendicularly to the incoming tape before the tape reaches the mud chamber 72 to cut it as shown in his FIG. 4. Spring portion 138 then ejects the cut tape forwardly through the dispensing chamber 72 toward the main roller 40. The controls for extending the creasing roller 166 and cutter 78 extend backwardly of the main roller 40 to a position adjacent the rear hand grips of the taping tool.

Other taping tools and tape dispensers include U.S. Pat. No. 3,880,701 to Moree issued on Apr. 29, 1975, U.S. Pat. No. 3,260,638 to Hoveland issued on July 12, 1966, U.S. Pat. No. 3,006,495 to Miller issued on Oct. 31, 1971, U.S. Pat. No. 3,968,001 to Lockwood issued on July 6, 1976, U.S. Pat. No. 2,846,106 to Castiglione issued on Aug. 5, 1958. Moree has a retractable creasing roller 87 that can be extended by manipulating lever 92 which is located at the rear of the tool. Moree's cutter 70 can be selectively operated to cut the tape at a point between the dispensing chamber outlet and the main rollers 47. Hoveland uses a piston 26 within the cylinder 1 to advance the joint compound into the dispensing chamber 3. His creasing roller 51 can be selectively extended by manipulating a lever system that extends rearwardly of the tool and his tape cutter 41 can be moved perpendicularly to the tape to cut it between the dispensing chamber outlet and the main rollers 8. With the devices of Moree and Hoveland, the tape must be manually advanced and restrung about the main rollers after each cut. This is a very time consuming and inefficient procedure. The taping tool of Miller and the tape dispenser of Lockwood also cut their tape at a point behind the main roller; however, each of these devices has a gearing system so that the free end of the cut tape can be advanced outwardly of the device by continuing to press and move the roller 48 of Miller or the roller 104 of Lockwood against the wallboard. In most instances, the advancing cut end of the tape must still be manually restrung about the main roller. Further, with all of these devices, it is very difficult to accurately cut the tape so that it is the right length for the particular wallboard section, corner joint, or ceiling joint. This is particularly hard to do when the tape is being cut to fit in a corner joint or a ceiling joint. Castiglione illustrates a tape dispenser which has a cutter 58. Once Castiglione's tape is cut, his tool can be manipulated from the position shown in FIG. 7 to the position shown in FIG. 12 in order to pinch the free end of the cut tape between the tool and the sheet rock 64 so that the operator can begin taping a new section.

The creasing rollers of the devices of Lathrop, Moree, and Hoveland are designed to merely put a crease in the tape as it is applied to a corner joint or ceiling joint. These creasing rollers will not press the edges of the tape against the wallboards. Further, if the wallboard sections do not correctly meet and abut each other, these creasing rollers often end up pushing the tape so far into the space between the wallboards that it must be manually pulled out before it can be squared. With these devices that have only a creasing roller, a corner finishing tool such as the ones illustrated in U.S. Pat. No. 3,932,101 to Johnson, et al. issued on Jan. 13, 1975 and U.S. Pat. No. 3,925,145 to Ames issued on Dec. 9, 1975 must be used to finish pressing the edges of the tape against the corner joint or ceiling joint.

The ideal taping tool would be light weight, easy to manipulate, and have as few moving parts as possible. It would also enable the operator to accurately cut the tape at the end of a wallboard section and begin taping a new section without having to manually restring the freshly cut tape about the main rollers. Further, the ideal taping tool would have a corner roller which not only creases the tape but also squares it in a corner joint or ceiling joint. The ideal taping tool would also enable the operator to quickly and easily apply tape along straight joints, corner joints, and ceiling joints in small rooms or closets as well as in larger rooms. The present invention offers such a taping tool.

SUMMARY OF THE INVENTION

The present invention involves a portable taping tool for applying tape over joints in wallboard, sheet rock, gypsum board, drywall, and the like. The taping tool is light weight and can hold as much joint compound as previous taping tools weighing many times more. The invention has a main frame which has a dispensing chamber for joint compound, a mounting for a roll of tape, main rollers, a second roller, and a tape cutting blade. In one embodiment, the second roller is a corner roller that not only creases the tape but also squares it in the corner. The corner roller can be either rigidly supported in a forward, extended position or spring biased in its forward, extended position. In another embodiment, the second roller is substantially cylindrical and has a slightly concave shape to its rolling surface. The cylindrical, second roller of the embodiment is used to apply tape over flat joints and its slightly concave shape serves to concentrate the joint compound toward the middle of the tape so that the joint compound will be more evenly distributed when the tape is wiped down.

The tape cutting blade in each of the embodiments is supported to move along a path between the main rollers and the second roller. In this manner, the tape can be more easily seen and more accurately cut to fit the wallboard section, corner joint, or ceiling joint. Further, with this arrangement, the end of the freshly cut tape will still extend outwardly of the taping tool beyond the main rollers so that the taping tool can be manipulated to apply the tape to a new section without having to manually restring the tape about the main rollers. The invention also includes the addition of rollers at the tape inlet and tape outlet of the dispensing chamber so that the tape may more easily pass through the dispensing chamber. The taping tool of the present invention is much lighter than past tools and it is contemplated that the taping tool of the present invention could be made in part or entirely out of plastic to even further reduce its weight.

OBJECTS OF THE INVENTION

It is an object of this invention to provide a new and novel taping tool that is lightweight and easy to operate.

It is also an object of this invention to provide a new and novel taping tool that enables the operator to accurately cut the tape at the desired length.

Another object is to provide a new and novel taping tool that enables the operator to accurately cut the tape and begin taping a new section of wallboard without having to manually restring the freshly cut tape about the main rollers of the taping tool.

It is an object of this invention to provide a new and novel taping tool which has a corner roller which not only creases the tape but also squares it in a corner joint or a ceiling joint.

Another object of the invention is to provide a new and novel taping tool that enables the operator to quickly apply tape along straight joints, corner joints, and ceiling joints in small rooms or closets as well as in larger rooms.

It is an object of this invention to provide a new and novel taping tool which has a corner roller that is rigidly mounted to the main frame of the taping tool in a forward, extended position.

Another object is to provide a new and novel taping tool which has a corner roller that is mounted to the main frame of the taping tool and spring biased in a forward, extended position.

A further object of the invention is to provide a new and novel taping tool that has a substantially cylindrical roller which has a slightly concave working surface which enables the taping tool to concentrate the joint compound near the center of the tape so that the joint compound will be more evenly distributed when the tape is wiped down.

It is also an object of this invention to provide a new and novel taping tool which has rollers mounted at the tape inlet and outlet openings in the dispensing chamber so that the tape can be easily and smoothly drawn through the dispensing chamber.

Additional objects as well as features and advantages of this invention will become evident from the descriptions set forth hereinafter when considered in conjunction with the accompanying drawings.

DETAILED DESCRIPTION OF THE PREFERRED EMBODIMENTS

Figures 1, 2:
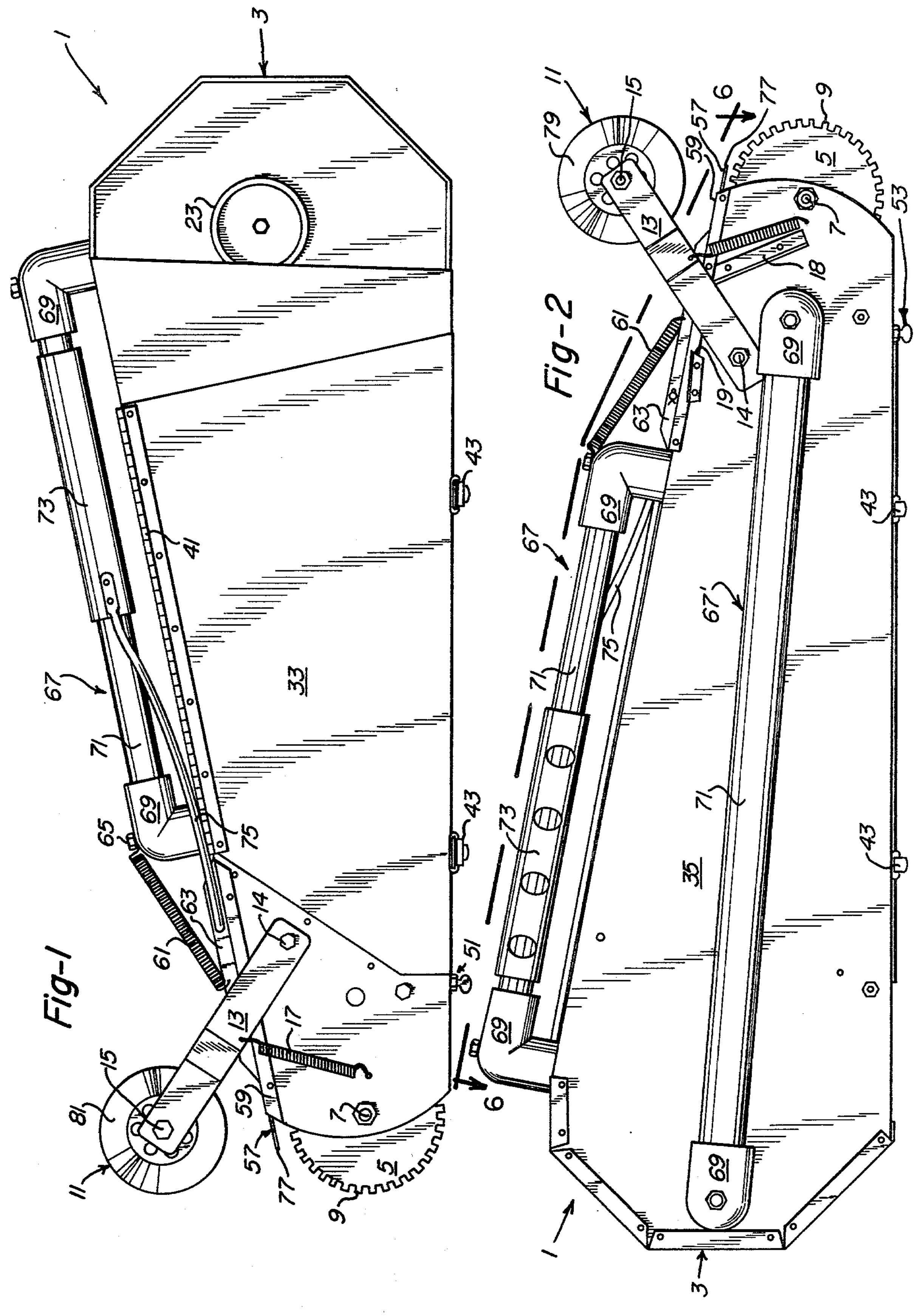
FIG. 1 is a side view of the taping tool of the present invention.
FIG. 2 is a view of the taping tool as seen from the opposite side of FIG. 1.
Figures 3, 4, 5:
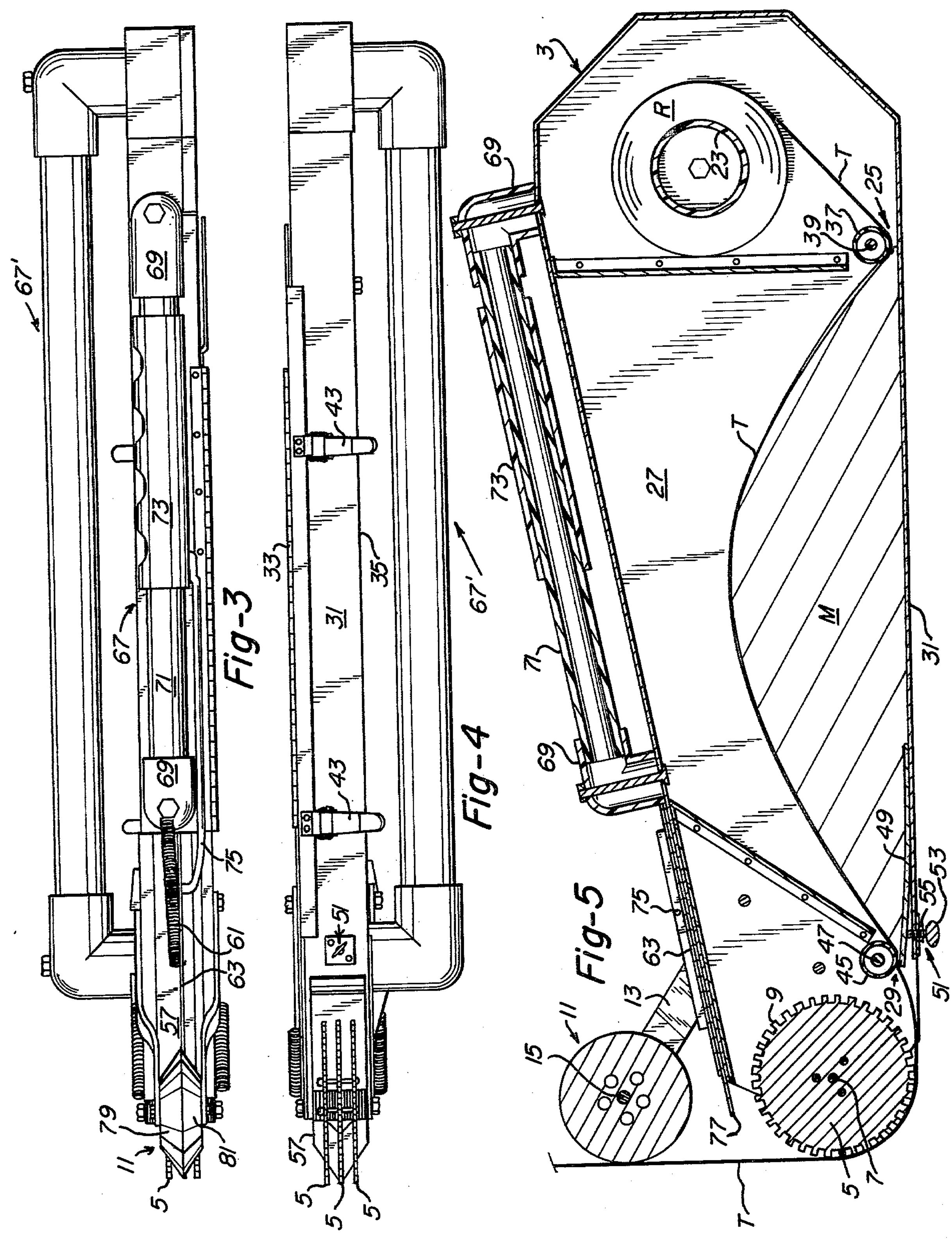
FIG. 3 is a top view of the taping tool of FIG. 1.
FIG. 4 is a bottom view of the taping tool of FIG. 1.
FIG. 5 is a cross-sectional view of the taping tool illustrating the relationship of the elements and the manner in which the tape is strung through the taping tool.

As best seen in FIGS. 1 and 2, the taping tool 1 of the present invention has a main frame 3 to which the main rollers 5 are mounted for free rotation about a first axis 7. The main rollers 5 are preferably disc-shaped with teeth 9 spaced about their peripheries. Corner roller 11 is mounted to the main frame 3 by arms 13 for rotation about an axis 14 and corner roller 11 is mounted to arms 13 for free rotation about axis 15. Spring 17 biases the arms 13 and corner roller 11 toward its extended, forward position. In this embodiment, corner roller 11 is mounted for limited movement about axis 14 between stops 18 and 19 as best seen in FIG. 2. A roll R of tape in FIG. 5 is mounted about the roller 23 and the tape T is drawn through the tape inlet opening 25 in the dispensing chamber 27 and out the tape outlet opening 29. A joint compound or mud M is placed between the tape T and the floor member 31 of the dispensing chamber 27 so that the mud M will be placed on one side of the tape T as it is drawn through the dispensing chamber 27.

The tape inlet opening 25 is defined by one end portion of the floor member 31, sidewalls 33 and 35, and roller 37 which is mounted for rotation about axis 39. A portion of sidewall 33 is pivotally mounted at 41 to the main frame 3 so that mud M can be added to the dispensing chamber 27 as needed. Latches 43 keep the movable portion of sidewall 33 closed during operation of the taping tool 1. The tape outlet opening 29 of the dispensing chamber 27 is located between a second end portion of the floor member 31, sidewalls 33 and 35, and roller 45 which is mounted for rotation about axis 47. Flexible plate 49 is secured at one end to the floor member 31 and positioned so that the free end can be selectively moved by turning screw member 51 to adjust the size of the tape outlet opening 29. Screw member 51 passes through a hole in the floor member 31 and has a head portion 53 for easy manipulation. Nut 55 is mounted about the stem of the screw member 51 so that the screw member 51 can be turned to a desired position and locked in place. The position of the free end of the flexible plate 49 is determined by the screw member 51 controls the size of the tape outlet opening 29 and the amount of mud M that is placed on the one side of the tape T as it is drawn through the dispensing chamber 27.

Figures 6, 7, 8, 9, 10, 11, 12:
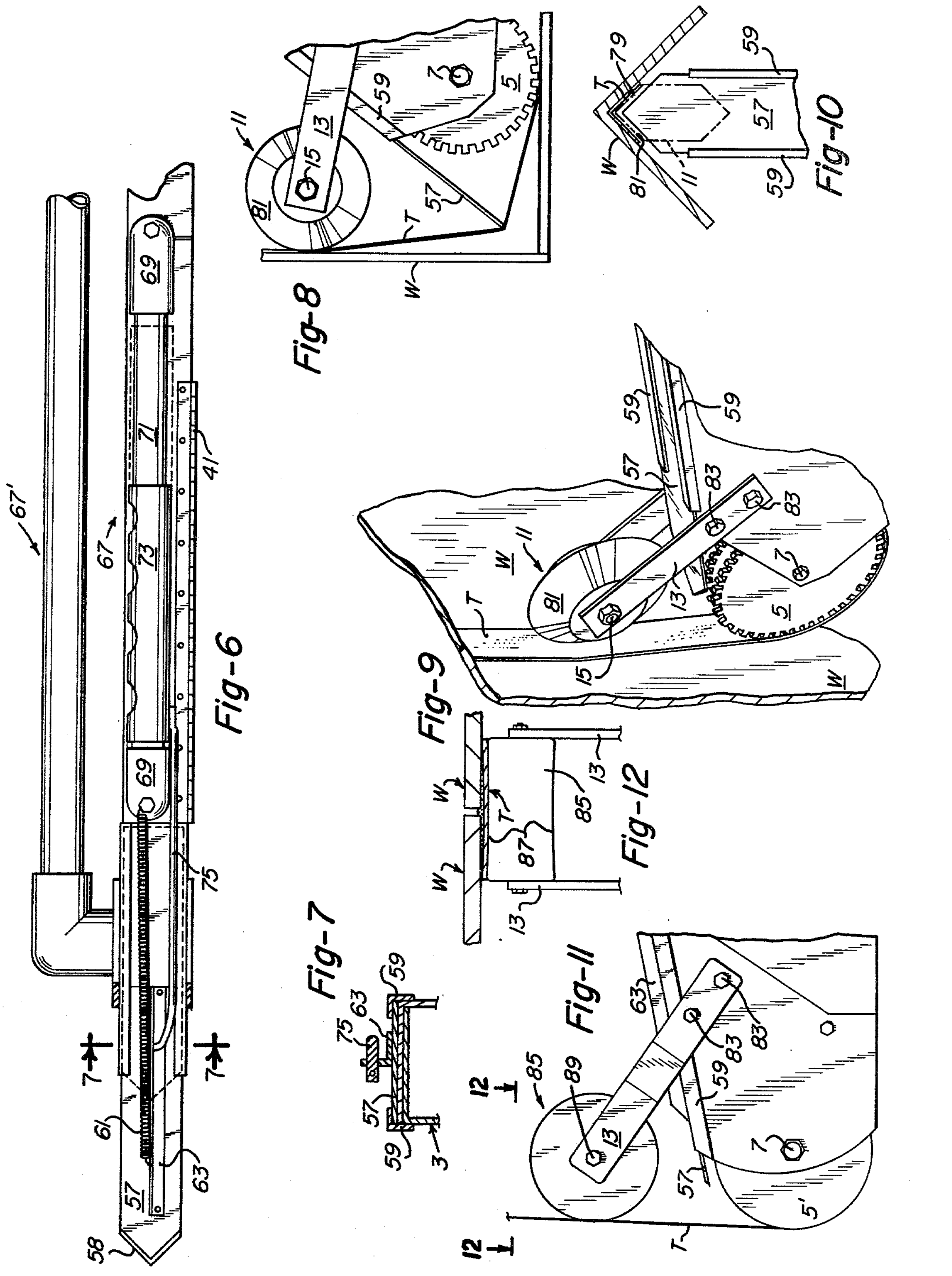
FIG. 6 is a view of all line 6—6 of FIG. 2 illustrating in dotted lines and full lines the retracted and extended positions of the cutting blade.
FIG. 7 is the view along line 7—7 of FIG. 6 illustrating the manner in which movement of the cutting blade is controlled and guided.
FIG. 8 is a view of the manner in which the taping tool of the present invention can be used to apply tape to a corner joint or ceiling joint.
FIG. 9 is a perspective view illustrating how the taping tool of the present invention can be used to apply tape to a flat seam and how the taping tool can be manipulated so that the corner roller holds the tape against the flat seam while the tape is being cut. In the embodiment of FIG. 9, the corner roller is mounted to the main frame of the taping tool for rotation about a fixed axis. In this embodiment, the axes of the corner roller and the main rollers are fixed relative to each other.
FIG. 10 illustrates how the corner roller not only creases the tape but also squares the tape in a corner joint or ceiling joint. Each of the legs 79 and 81 of the corner roller 11 is shown in this view to extend outwardly from the apex of the corner roller for a distance equal to about half the width of the tape.
FIG. 11 illustrates another embodiment of the invention in which the main rollers have a smooth periphery and the corner roller is replaced by a substantially cylindrical roller which has a slightly concave shape. This embodiment is primarily designed to be used when placing tape over a flat seam. The slightly concave shape of the cylindrical roller tends to concentrate the joint compound toward the center of the tape so that the joint compound will be more evenly distributed when the tape is wiped down.
FIG. 12 is a top view of the embodiment of FIG. 11 illustrating the slightly concave shape of the working surface of the cylindrical roller. As discussed above, the slightly concave shape of this cylindrical roller tends to concentrate the joint compound toward the middle of the tape so that the joint compound will be more evenly spread when the tape is wiped down.

The cutting blade 57 is mounted between guide members 59 on the main frame 3 for movement relative to the main frame 3 along a blade path between the retracted position and an extended position. Spring 61 biases the cutting blade 57 toward the retracted position as shown in FIGS. 1 and 2. One end of the spring 61 is attached to the angle member 63 mounted on the cutting blade 57 and the other end is fixed at 65 to hand grip 67 of the pair of hand grips 67 and 67'. Each of the hand grips 67 and 67' consists of right angle members 69 which are mounted to the main frame 3 and tubular member 71 which extends between the two members 69. Tubular control member 73 is mounted about the member 71 of hand grip 67 and is slidable relative thereto as illustrated in FIGS. 1 and 6. The control member 73 is connected by bar 75 and angle member 63 to the cutting blade 57 as best seen in FIGS. 1, 6, and 7. As the control member 73 and connecting members 75 and 63 are moved forwardly, they move the cutting blade 57 from its retracted position which is shown in dotted lines in FIG. 6 toward its extended, cutting position. Any tape T running along a path out of the tape outlet opening 29 of the dispensing chamber 27, about a portion of the main rollers 5, and across the blade path of the cutting blade 57 will be cut at a location forwardly of the main rollers 5 along the running path of the tape T.

The axes 7 and 15 of the main rollers 5 and the corner roller 11 are substantially parallel and substantially coplanar, and, the cutting blade 57 travels in a direction between the axes 7 and 15 as it moves towards its extended position. In the extended position, the sharpened, cutting tip 77 of the blade 57 extends beyond a common tangent of the substantially circular peripheries of the main rollers 5 and the corner roller 11 as best seen in FIGS. 5 and 8. With this arrangement, any tape T running along a path out of the tape outlet opening 29 in the dispensing chamber 27, about a portion of the main rollers 5, and linearly to and about a portion of the corner roller 11 will be cut at a location between the main rollers 5 and the corner roller 11. The cutting tip 77 of the blade 57 is substantially V-shaped and symmetrically positioned so that the apex of the V-shape contacts a central portion of the tape T. The corner roller 11, main rollers 5, and cutting tip 77 are all symmetric relative to a common plane that is perpendicular to the axes 7 and 15.

Corner roller 11 has first and second sides extending outwardly of the axis 15. Sides tapered toward each other in a direction away from the axis 15 and the two legs 79 and 81 of the tapering sides meet at a substantially 90° angle to form a V-shape. The legs 79 and 81 extend from the apex of the V for a distance substantially equal to one-half the width of the tape T as best seen in FIG. 10. In the preferred embodiment of FIGS. 8–10, arms 13 are fixedly attached to the main frame 3 by bolts 83 so that the axes 7 and 15 are fixed relative to each other.

In the embodiment of FIG. 11, the main rollers 5' have smooth, circular peripheries. If desired, the main rollers 5' can be replaced with a single, substantially cylindrical pressure roller. Also, in the embodiment of FIGS. 11 and 12, a substantially cylindrical roller 85 with a slightly concave working surface 87 extending parallel to the axis 89 of rotation is mounted between the arms 13. The arms 13 can be moved further apart to accommodate the wider roller 85 by added washers or other spacers between the head of the bolts 83 and the main frame 3. The roller 85 is primarily used to apply tape over a flat seam. The slightly concave shape of its working surface 87 serves to concentrate the joint compound toward the center of the tape T so that the joint compound will be more evenly spread when the tape T is wiped down.

In the embodiments of FIGS. 1–7 in which the corner roller 11 is mounted for limited movement between stops 18 and 19, the taping tool 1 can be manipulated to tightly press the tape T against the wallboard W prior to extending the cutting blade 57. In the taping tool of this embodiment, the corner roller 11 moves about the axis 14 against the force of spring 17 until it abuts the stop 19. During this movement, main rollers 5 are moved away from the wallboard W so that the cutting blade 57 can be extended to cut the tape while the corner roller 11 tightly presses the tape T between it and the wallboard W. In the preferred embodiments of FIGS. 8–10, the arms 13 are fixedly attached to the main frame 3 of the taping tool 1 so that the axes 7 and 15 are fixed relative to each other. In this embodiment, the force of the corner roller 11 is applied directly to the tape against the wallboard W as the taping tool 1 is manipulated. In the embodiment of FIGS. 1–7, the strength of the spring 61 determines how much force the corner roller 11 initially applies to the tape against the wallboard. Upon continued manipulation of the taping tool 1 so that the arm 13 abuts stop 19, the force of the corner roller 11 pressing the tape T against the wallboard W is then directly applied to the tape T as in the embodiment of FIGS. 8–10.

In operation, latches 43 are released and the portion of sidewall 33 moved about the pivot mounting 41 to open the dispensing chamber 27 so that mud M can be placed therein adjacent the floor member 31. Tape T from the roller R mounted on roller 23 is run through the tape inlet opening 25 between the floor member 31 and roller 37, up around the mud M and out the tape outlet opening 29 between roller 45 and the free end of the flexible plate 49 as best seen in FIG. 5. The tape T is then pulled away from the tape outlet opening 29 of the dispensing chamber 27 for sufficient distance so that the taping tool 1 can be positioned with the tape between the main rollers 5 and the wallboard. By pressing the main rollers 5 against the wallboard with the tape T therebetween and moving the taping tool 1, the tape T can be easily and quickly applied to the wallboard. For straight sections of wallboard, the taping tool 1 can be held so that the corner roller 1 also presses the tape T against the wallboard if desired.

In a preferred manner of operation, the tape T is cut by first manipulating the taping tool 1 so that the corner roller 11 tightly holds the tape T against the wallboard W while the main rollers 5 are positioned slightly away from the wallboard W as seen in FIG. 9. The cutting blade 57 is then moved toward its extended position by pushing control member 73 forward and the tape T is cut at a location between the main rollers 5 and the corner roller 11. After a cut, the free end of the freshly cut tape still extends outwardly of the tape outlet opening 29 of the dispensing chamber 27 for a sufficient distance so that the taping tool 1 can be manipulated so that the main rollers 5 again press the tape T against the wallboard. In this manner, several sections of tape can be placed against the wallboard without the operator having to manually pull the tape outwardly of the tape outlet opening 29 after each cut and without him having to rotate the main rollers of the taping tool to advance the tape by a gear system as is prevalent in prior art taping tools. With the present invention, the operator can quickly and easily apply a section of tape T to the wallboard, cut the tape T and apply a second section of tape T to the wallboard without having to manually pull the tape T or wait for its controlled advance as is the case with many prior taping tools. Further, with the cutting of the tape taking place forwardly of the main roller 5 in the direction of the running tape T rather than behind the main rollers 5 as in previous taping tools, the operator can more clearly see and more accurately cut the tape T at the right length to more precisely fit the wallboard section that he is taping. This is especially important when running tape across a corner joint or joint between a wall and the ceiling as shown in FIG. 8. Further, cutting blade 57 can be advanced to cut at a rapid or slow speed. When advanced rapidly, the tendency is for both ends of the cut tape T in FIG. 8 to move against the wallboards W and stick there so that the tape T can be quickly and easily applied across a corner joint or joint between a wall and the ceiling.

The taping tool 1 of the present invention also includes a corner roller 11 where previous tools have only a thin, creasing roller. The corner roller 11 of the present invention has tape engaging sides or legs 79 and 81 that are about one-half the width of the tape T. Consequently, as illustrated in FIG. 10, tape T can be applied along a corner joint or joint between a wall and the ceiling with the corner roller 11 squaring the tape T. The corner roller 11 is a finishing roller so that the tape T needs only to be wiped down after being applied by the taping tool 1.

While several embodiments of the present invention have been described in detail herein, various changes and modifications can be made without departing from the scope of the invention.

We claim:

1. A method for applying a continuous strip of tape to wallboard and the like, said method comprising the steps of:

(a) applying an adhesive material to at least one side of the tape,
(b) running the tape along a path in a forward direction about a portion of a first roller means having a first axis of rotation and linearly to and about a portion of a second roller means having a second axis of rotation fixed in relationship to said first axis,
(c) pressing the tape between the first roller means and the wallboard with said at least one side of the tape against the wallboard,
(d) moving the first roller means along said wallboard,
(e) pressing the tape between the second roller means and the wallboard while maintaining pressure between the first roller means and the wallboard,
(f) moving the first roller means away from the wallboard while maintaining the fixed relationship between said first and second axes of rotation, and
(g) projecting a retractable blade into and cutting the tape at a location on said tape path between said first roller means and said second roller means.

2. The method of claim 1 wherein the second roller means is a corner roller with annular angularly related tape engaging sides and step (e) includes the limitation of pressing the tape, across the substantially full width thereof, between the corner roller and the wallboard.

3. A method for applying a continuous strip of tape to wallboard and the like, said method comprising the steps of:

(a) applying an adhesive material to at least one side of the tape,
(b) running the tape along a path in a forward direction about a portion of a first roller means and about a portion of a second roller means,
(c) pressing the tape between the first roller means and the wallboard with said at least one side of the tape against the wallboard,
(d) moving the first roller means along said wallboard,
(e) pressing the tape between the second roller means and the wallboard,
(f) moving the first roller means away from the wallboard while retaining said tape about a portion of said first roller means, and,
(g) cutting the tape at a location on said tape path between said first roller means and said second roller means while still retaining said tape about a portion of said first roller means.

4. The method of claim 3 wherein the second roller means is as corner roller with annular angularly related tape engaging sides and step (e) includes the limitation of pressing the tape, across the substantially full width thereof, between the corner roller and the wallboard.

5. The improvement of claim 4 wherein said main roller means includes at least one roller member and each respective mounting means for said first and second roller means mounts said at least one roller member and said corner roller respectively for rotation independently of each other.

6. The improvement of claim 4 wherein said first and second rotational axes are fixed relative to each other.

7. In a portable taping tool having a main frame with a dispensing chamber containing a joint compound in which a continuous strip of tape is passed therethrough, the tape passing into said dispensing chamber through an inlet and out of said dispensing chamber through an outlet whereby the joint compound is applied to at least one side of said tape as the tape passes through the dispensing chamber, said taping tool further having main pressure roller means for applying the tape against the wallboard and means for mounting the main pressure roller means on said main frame for rotation about a first axis spaced from the outlet of said dispensing chamber, the improvement including:

second roller means and means for mounting said second roller means on said main frame for rotation about a second axis spaced from said first axis generally to the opposite side thereof from said tape outlet, said second roller means being a corner roller, said corner roller having first and second tape engaging sides extending outwardly of said second axis, said first and second sides being of a combined width generally equal to the width of the tape and tapering toward each other in a direction away from said second axis to form a substantially V-shape having two substantially straight legs meeting at a substantially 90° angle, and tape cutting means, said tape cutting means including a cutting blade and means for mounting said cutting blade on said main frame for movement relative thereto between a retracted position and an extended position, said cutting blade having a cutting tip, said cutting tip moving outwardly of said main frame in a direction between said first and second axis as said cutting blade is moved toward said extended position whereby any tape running along a path out of said tape outlet opening in said dispensing chamber, about a portion of said main roller means, and about a portion of said corner roller will be cut at a location between said main pressure roller means and said corner roller.

8. The improvement of claim 7 wherein said main roller means includes at least one roller member and each respective mounting means for said first and second roller means mounts said at least one roller member and said corner roller respectively for rotation independently of each other.

9. The improvement of claim 7 wherein said first and second rotational axes are fixed relative to each other.

10. The method of claim 1 wherein said second roller means is a roller with a substantially concave annular working surface, and including applying the adhesive material across substantially the full width of the tape, and concentrating the adhesive material toward the longitudinal center of the tape by movement of the second roller means therealong.

11. The method of claim 3 wherein said second roller means is a roller with a substantially concave annular working surface, and including applying the adhesive material across substantially the full width of the tape, and concentrating the adhesive material toward the longitudinal center of the tape by movement of the second roller means therealong.

12. In a portable taping tool in which a continuous strip of tape is passed through a dispensing chamber containing a joint compound, the tape passing into said dispensing chamber through an inlet and out of said dispensing chamber through an outlet whereby the joint compound is applied to at least one side of said tape as the tape passes through the dispensing chamber, said taping tool further having main pressure roller means for applying the tape against wallboard and means for mounting the main pressure roller means for rotation about a first axis spaced from the outlet of said dispensing chamber, the improvement wherein:

said main pressure roller means includes a roller with a substantially concave annular working surface whereby the joint compound is concentrated toward the center of the tape as the tape is pressed between said roller and the wallboard.

* * * * *